United States Patent
McManus et al.

(10) Patent No.: US 6,525,557 B1
(45) Date of Patent: Feb. 25, 2003

(54) METHOD FOR WATERMARKING A REGISTER-BASED PROGRAMMABLE LOGIC DEVICE CORE

(75) Inventors: James L. McManus, Longmont, CO (US); Eric J. Crabill, San Jose, CA (US); James L. Burnham, Morgan Hill, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/053,415

(22) Filed: Nov. 2, 2001

(51) Int. Cl.[7] .................. H03K 19/00; H03K 19/177
(52) U.S. Cl. .................. 326/8; 326/39; 711/163
(58) Field of Search .................. 326/8, 37, 39; 711/163, 165; 710/200; 713/200

(56) References Cited

U.S. PATENT DOCUMENTS 5,784,577 A * 7/1998 Jacobson et al. .......... 710/104
6,331,784 B1 * 12/2001 Mason et al. ................. 326/8

OTHER PUBLICATIONS

"The Programmable Logic Data Book", Jan. 29, 1999, (Version 1.5) pp. 6–61–6–68, Xilinx, Inc., 2100 Logic Drive, San Jose, CA 95124.

* cited by examiner

*Primary Examiner*—Michael Tokar
*Assistant Examiner*—James H Cho
(74) *Attorney, Agent, or Firm*—John Kubodera; Bever, Hoffman & Harms

(57) ABSTRACT

A core for a register-based programmable logic device includes a register configured to provide a hidden identifier in response to a secret unlock operation. The identifier is inaccessible during normal operation of the core implementation. The unlock operation is selected to be an action or set of actions that would typically not be performed during normal use of the core implementation. The logic associated with providing the hidden identifier in response to the unlock operation is configured to not interfere with normal operation of the core implementation. Therefore, the presence of this source identification capability is transparent to regular users (and unauthorized copyists) of the core implementation. The availability of the secondary identifier can be limited in duration to minimize the chances of accidental, or even intentional, discovery.

25 Claims, 7 Drawing Sheets

METHOD FOR WATERMARKING A REGISTER-BASED PROGRAMMABLE LOGIC DEVICE CORE

BACKGROUND OF THE INVENTION

1. Field of the Invention

The present invention relates to the field of programmable logic core designs, and in particular to a method and structure for incorporating a hidden identification marker in register-based cores.

2. Discussion of Related Art

Due to advancing semiconductor processing technology, integrated circuits have greatly increased in functionality and complexity. For example, programmable devices such as field programmable gate arrays (FPGAs) and programmable logic devices (PLDs) can incorporate ever-increasing numbers of functional blocks and more flexible interconnect structures to provide greater functionality and flexibility.

FIG. 1 is a simplified schematic diagram of a conventional FPGA 110. FPGA 110 includes user logic circuits such as input/output blocks (IOBs), configurable logic blocks (CLBs), and a programmable interconnect 130, which contains programmable switch matrices (PSMs). Each IOB and CLB can be configured through a configuration port 120 to perform a variety of functions. Programmable interconnect 130 can be configured to provide electrical connections between the various CLBs and IOBs by configuring the PSMs and other programmable interconnection points (PIPs, not shown) through configuration port 120. Typically, the IOBs can be configured to drive output signals or to receive input signals from various pins (not shown) of FPGA 110.

FPGA 110 is illustrated with 16 CLBs, 16 IOBs, and 9 PSMs for clarity only. Actual FPGAs may contain thousands of CLBs, IOBs, and PSMs. The ratio of the number of CLBs, IOBs, and PSMs can also vary.

FPGA 110 also includes dedicated configuration logic circuits to program the user logic circuits. specifically, each CLB, IOB, PSM, and PIP contains a configuration memory (not shown) that must be configured before each CLB, IOB, PSM, or PIP can perform a specified function. Typically, the configuration memories within an FPGA use static random access memory (SRAM) cells. The configuration memories of FPGA 110 are connected to configuration port 120 through a configuration structure (not shown) and a configuration access port (CAP) 125. Configuration port 120 (a set of pins used during the configuration process) provides an interface for external configuration devices to program the FPGA. The configuration memory is typically arranged in rows and columns. The columns are loaded from a frame register (part of the configuration structure referenced above), which is in turn sequentially loaded from one or more sequential bitstreams. In FPGA 110, configuration access port 125 is essentially a bus access point that provides access from configuration port 120 to the configuration structure of FPGA 110.

FIG. 2 illustrates a conventional structure used to configure FPGA 110. Specifically, FPGA 110 is coupled to a configuration device 230 such as a serial programmable read only memory (SPROM), an electrically programmable read only memory (EPROM), or a microprocessor. Configuration port 120 receives configuration data, usually in the form of a configuration bitstream, from configuration device 230. Configuration data from configuration device 230 is transferred serially to FPGA 110 through a configuration data input pin or pins (not shown) in configuration port 120. Specific examples for configuring various FPGAs can be found on pages 6–60 to 6–68 of "The Programmable Logic Data Book 1999" (hereinafter "The Xilinx 1999 Data Book"), published in March, 1999 by Xilinx, Inc., and available from Xilinx, Inc., 2100 Logic Drive, San Jose, Calif. 95124. Additional methods to program FPGAs are described by Lawman in commonly assigned U.S. Pat. No. 6,028,445 entitled "DECODER STRUCTURE AND METHOD FOR FPGA CONFIGURATION" by Gary R. Lawman.

Note that as the differences between logic classifications have begun to blur, the traditional designators for the various classifications have become less meaningful. For example, many FPGAs now include hardwired circuitry and enhanced routing capabilities formerly reserved to ASICs, while many ASICs have begun to incorporate FPGA-like reprogrammable elements. Furthermore, design data can now be readily translated between different logic types, making implementation, say, of a FPGA design in an ASIC a relatively straightforward process. Therefore, for the purposes of the present invention, the term "register-based programmable logic device" will be used to denote all logic that includes memory elements, such FPGAs and ASICs, among others.

To simplify the design process and shorten the design cycle for register-based programmable logic devices, many vendors provide predefined cores (sometimes referred to as intellectual property, or IP). A core is simply a specific set of configuration information that implements a particular system function, such as a PCI bus or a digital signal processing algorithm. A core (or cores) can then be incorporated by a user of the register-based programmable logic into the user's own design file. The user benefits from the core because the user does not need to spend the time or resources to develop the complex logic included in the core. Further, since the vendor profits from selling the same core to many users, the vendor can spend the time and resources to design optimized cores. For example, the vendor can strive to provide cores having high performance, flexibility, and low gate count.

However, the very convenience afforded by these cores makes them susceptible to unauthorized appropriation by unlicensed users. Various methods have been suggested to minimize the chances of programmable logic design data piracy. For example, it has been proposed that FPGAs include embedded decryption circuits to decrypt encrypted cores. Alternatively, encrypted cores are decrypted prior to creation of the configuration bitstream. Both of these methods are described by Burnham et al. in commonly assigned, co-pending U.S. patent application Ser. No. 09/232,022, entitled "METHODS TO SECURELY CONFIGURE AN FPGA TO ACCEPT SELECTED MACROS" by James L. Burnham, Gary R. Lawman, and Joseph D. Linoff, which is referenced above. It has also been proposed that the configuration data stored in configuration device 230 be marked with markers, also known as watermarks. This method is described in U.S. patent application Ser. No. 09/513,230, filed on Feb. 24, 2000, and entitled "WATERMARKING FPGA CONFIGURATION DATA" by James L. Burnham.

However, in many instances, the configuration data or device for a product will not be readily available. The actual device, or core implementation, may be in a non-reprogrammable form, making configuration data analysis difficult. Therefore, it is desirable to provide some other means of identifying misappropriated IP. Hence, there is a need for a method to watermark the actual product created from a set of configuration data.

SUMMARY

The present invention provides a method for concealing an identifier in a core design by "hiding" the identifier in a location that is inaccessible during normal operation of the core implementation. "Normal operation" refers to the operation of the core implementation to perform the function for which it is intended. Access to the identifier requires a predefined unlock operation that is known only to those who would need to check the source of a particular programmable logic design. For example, it would be undesirable for the unlock operation to be described in the standard literature or documentation for the core (or associated core implementation), since an unauthorized copyist would then be able to detect and remove/change this identification information. Therefore, the unlock operation would typically be known only to the original core designers, thereby allowing those original designers to check the originality of any suspicious competitive products.

The unlock operation is selected to be an action sequence (i.e., a single action or multiple actions) that would typically not be performed during normal operation of the core implementation. Furthermore, the logic associated with providing the hidden identifier in response to the unlock operation is configured to not interfere with normal operation of the core implementation. Therefore, the presence of this source identification capability is transparent to regular users (and unauthorized copyists) of the core implementation.

A register-based programmable logic device in accordance with an embodiment of the present invention includes a register that returns a secondary identifier only when an unlock operation is performed. At all other times, the register behaves as would be expected for the core implementation in which it is incorporated. The register can be any memory location within the core implementation. A detector circuit replaces the output of the register with the secondary identifier in response to the unlock operation. In accordance with an embodiment of the present invention, the replacement involves storing the secondary identifier in the register. In accordance with another embodiment of the present invention, the replacement involves intercepting the output of the register and substituting the secondary identifier. The availability of the secondary identifier can be limited in duration to minimize the chances of accidental, or even intentional, discovery. According to an embodiment of the present invention, any read operation to a register other than the selected register (i.e., the register from which the secondary identifier can be read) resets the selected register, thereby cutting off access to the secondary identifier.

The unlock operation can comprise any defined action or set of actions. According to an embodiment of the present invention, the unlock operation comprises writing a specific data value to a specific register. According to another embodiment of the present invention, the unlock operation comprises performing a specified sequence of read and write operations to various registers.

The present invention will be more fully understood in view of the following description and drawings.

DETAILED DESCRIPTION

Figure 1:
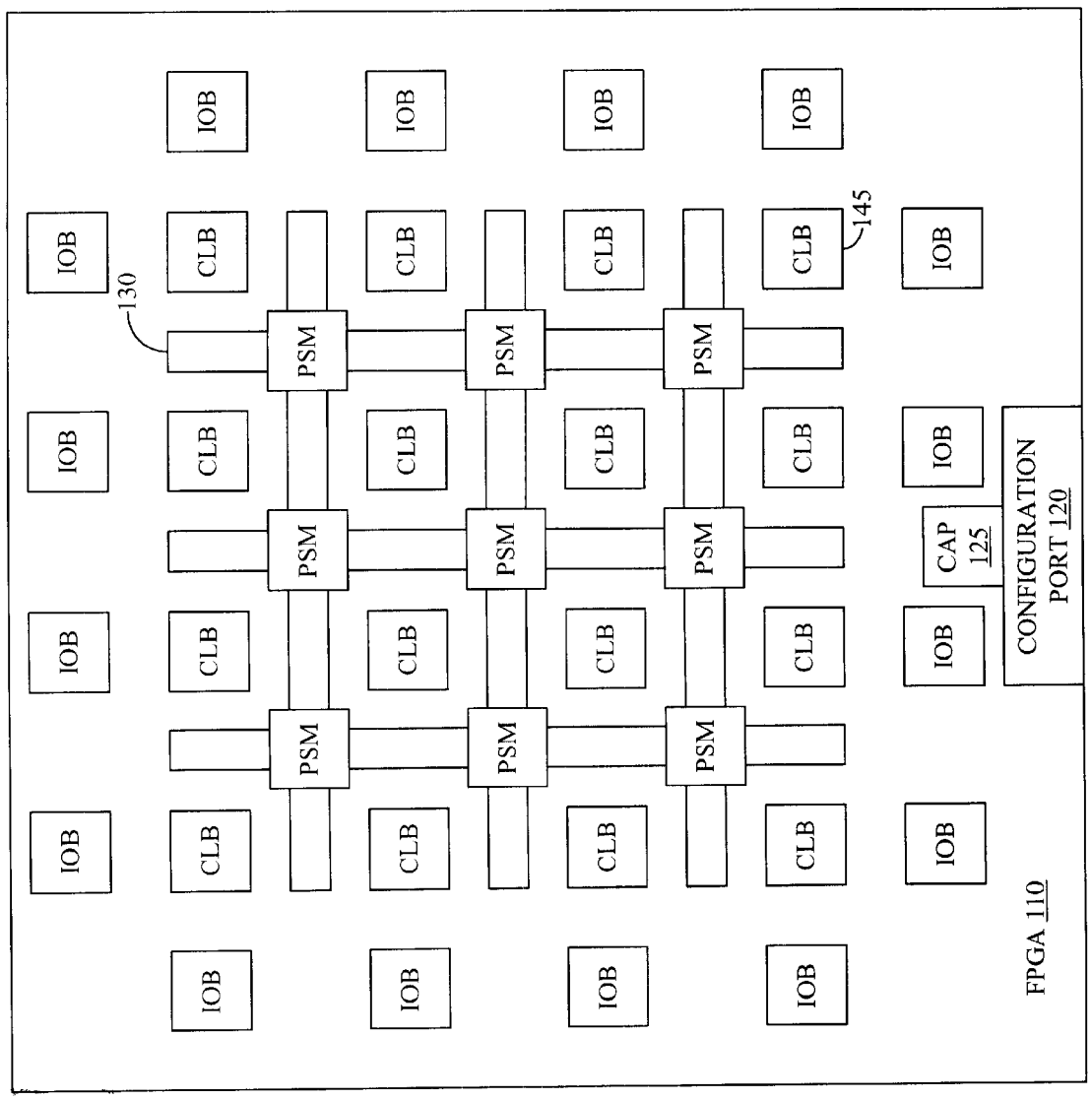
FIG. 1 is a simplified schematic diagram of a conventional FPGA.
Figure 2:
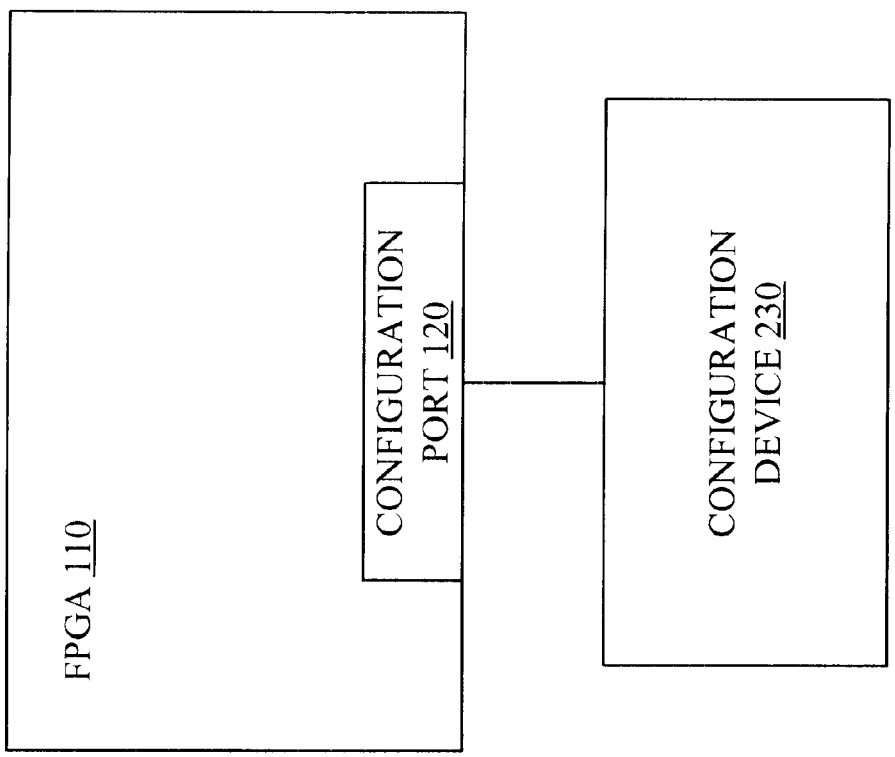
FIG. 2 is a prior art schematic diagram of an FPGA coupled to a configuration device.
Figure 3:
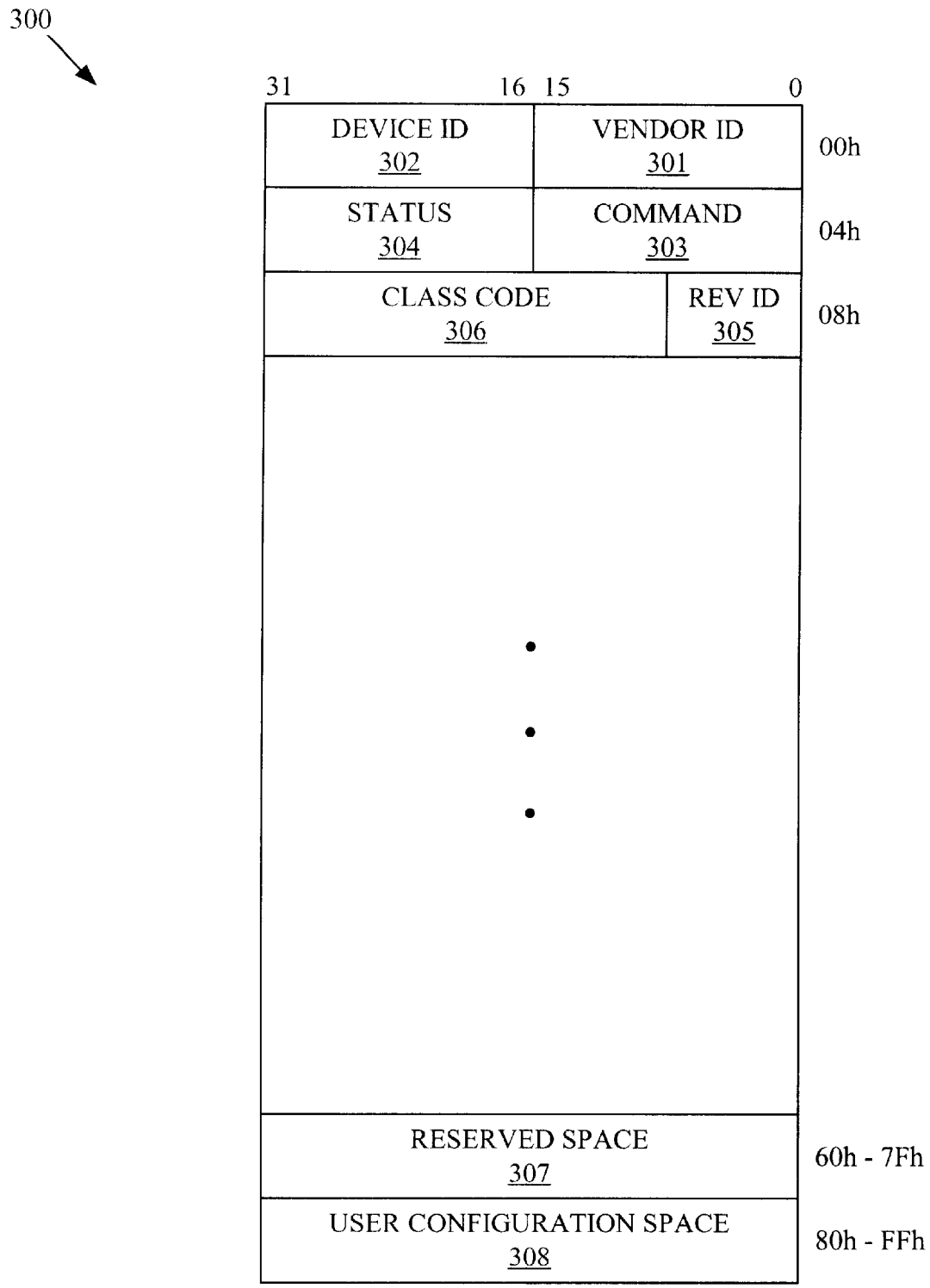
FIG. 3 is a diagram of an example configuration space for a conventional PCI core.

Generally, a vendor-generated core includes some sort of distinguishing data that identifies the developer of that particular core. For example, FIG. 3 shows an example PCI configuration space 300, as described in Xilinx LogiCore PCI-X Interface 5.0 Data Sheet, v5.0.032. Configuration space 300 represents 256 bytes of configuration memory in an FPGA that is programmed by the configuration bitstream synthesized from the core data. Configuration space 300 is divided into multiple fields, which include fields 301–308. The layout and allowable content of these configuration fields are defined by a standard PCI bus specification ("PCI-X Addendum to the PCI Local Bus Specification, Revision 1.0a"), which is maintained by an industry organization, the PCI-SIG. In accordance with the PCI-X bus specification, some of the fields (including fields 301–306) provide constant configuration settings that are read by a system host. For example, field 301 includes a vendor ID that identifies the manufacturer of the core. The vendor ID is a unique identifier associated with a particular manufacturer, and is assigned by the PCI-SIG. Similarly, field 302 includes a device ID that is intended to provide a unique identifier for the application embodied in the core. configuration space 300 also includes field 307 that reserves 64 bytes of configuration memory for future expansion, implementation of specific features, or backwards compatibility. Most standard core implementation specifications provide for this type of "reserved space" to provide some flexibility for the specification. Finally, field 308 provides 128 bytes of user configuration space for user-defined applications.

At first glance, it may seem that the vendor ID (field 301) provides a means for identifying the source of a particular application core. It is generally quite difficult for would-be pirates to make substantial modifications to stolen IP due to the complexity of the design data. For example, the most common form of IP theft involves copying the netlist for a particular product. Making design modifications to that netlist without causing unintended problems in the operation of the final core implementation would require a deeper understanding of the netlist data than would be feasible for most would-be pirates. However, the vendor ID incorporated into the netlist can be easily changed because the size and location of the vendor ID field is explicitly defined in the PCI-X bus specification. The same would apply to any product for which published specifications are available. Therefore, core developers may wish to provide a less visible means of manufacturer identification.

Figure 4:
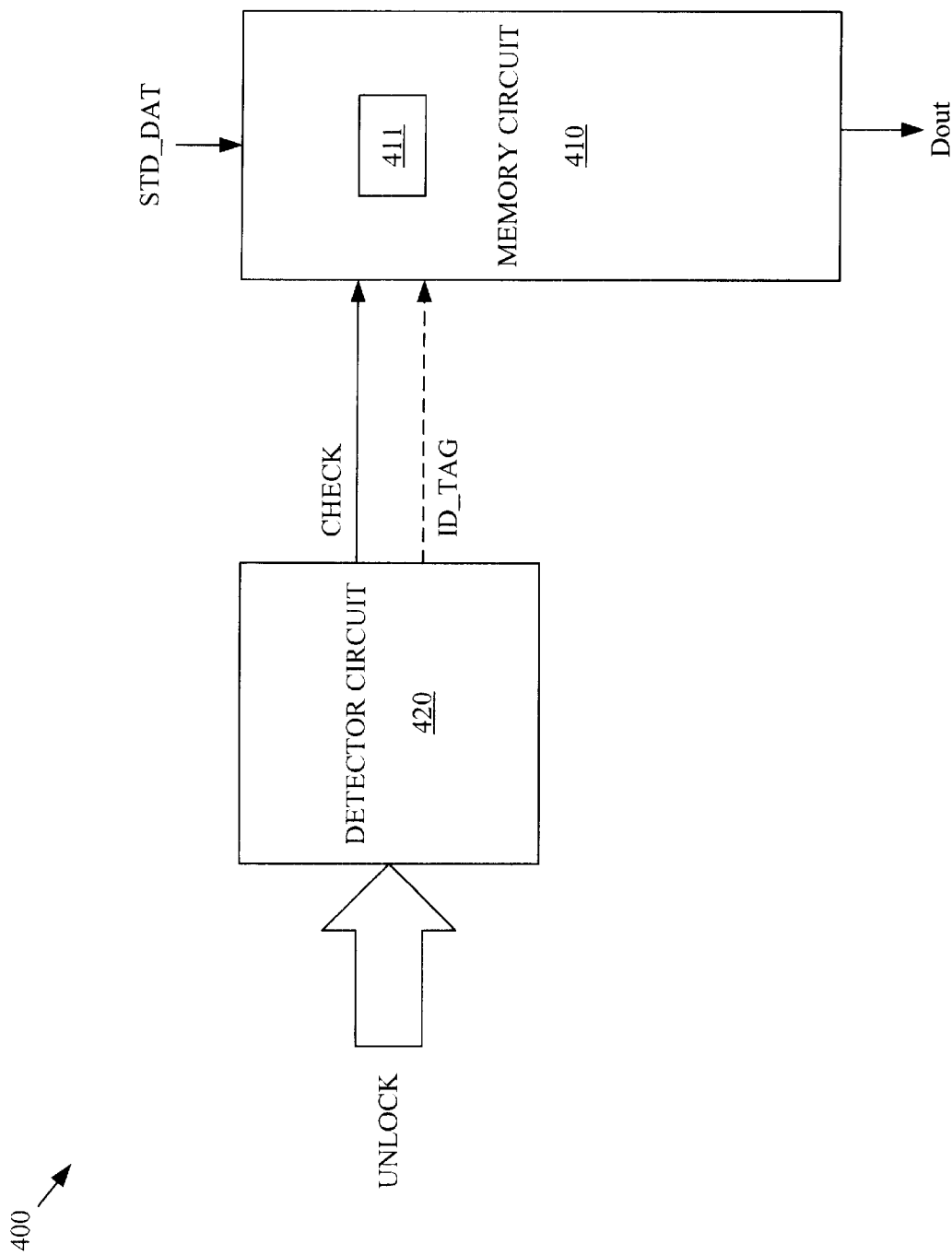
FIG. 4 is a schematic diagram of a hidden identification circuit in accordance with an embodiment of the present invention.

In accordance with an embodiment of the present invention, a core implementation (i.e., the actual implementation of a core in a register-based programmable logic device) includes an identification circuit that conceals an identification tag that is only accessible after a specific unlock operation is performed. For example, FIG. 4 shows an identification circuit 400 that can be included in a larger core implementation, in accordance with an embodiment of the present invention. Identification circuit 400 includes a detector circuit 420 coupled to a memory circuit 410. Memory circuit 410 includes a register 411 and associated circuitry (not shown) for reading from and writing to register 411. Register 411 can comprise any memory location in the core implementation. For example, register 411 could comprise one of the fields in PCI configuration space 300 shown in FIG. 3.

Identification circuit 400 is configured such that a read operation to register 411 returns an output data value Dout. Output data value Dout can either comprise an expected value STD_DAT from register 411 or an identification tag ID_TAG. During normal operation of the core implementation (i.e., operation of the core implementation for its intended usage), output data value Dout is equal to expected value STD_DAT, which is either stored in register 411 during the configuration process or written into register 411 from a data bus (not shown). For example, register 411 could be part of reserved space 307 in PCI configuration space 300 shown in FIG. 3. The PCI-X bus specification indicates that the registers in reserved space 307 should return zero values when read. Therefore, during normal operation, expected value STD_DAT and output data value Dout would be zero values. Of course, expected value STD_DAT can also represent multiple discrete values—for example, register 411 could be configured to store the results of operations from elsewhere in the core implementation.

During an identification operation, output data value Dout is set equal to identification tag ID_TAG, which would generally be a data value not expected from register 411 during normal operation, to minimize the potential for identification errors. An identification operation is triggered when detector circuit 420 detects an input operation UNLOCK, which in turn causes detector circuit 420 to send an identification signal CHECK to memory circuit 410. Identification signal CHECK causes memory circuit 410 to provide identification tag ID_TAG as output data value Dout. Identification tag ID_TAG can be provided by detector circuit 420 (as indicated by the dashed line in FIG. 4), or can be provided from a location within memory circuit 411 (not shown).

Input operation UNLOCK can comprise any prespecified action sequence selected to cause detector circuit 420 to generate identification signal CHECK. For example, input operation UNLOCK could comprise writing a prespecified value into detector circuit 420 (explained in further detail with respect to FIGS. 5c–5f). Alternatively, input operation UNLOCK could comprise a particular sequence of read and write operations to various registers in memory space 410. In any case, to ensure that output data value Dout is equal to expected value STD_DAT during normal operation, input operation UNLOCK is selected to be an action or group of actions that would not typically occur during normal operation, but is possible within the guidelines of any controlling core implementation specification. In this manner, the existence of detector circuit 420 can be concealed; e.g., neither the licensed user nor would-be pirate would notice the presence of detector circuit 420 during testing and usage of the core implementation. When a correct input operation UNLOCK is performed, the hidden identification information (i.e., identification tag ID_TAG) appears for reading, thereby allowing the original core designer to check the source of the core design.

According to an embodiment of the present invention, the length of time during which output data value Dout is equal to identification tag ID_TAG after input operation UNLOCK is detected can be limited to increase the difficulty of discovery. For example, memory circuit 410 could be reset after a certain number of clock cycles to return output data value Dout to expected value STD_DAT. Alternatively, identification tag ID_TAG could be made available for only a single read operation, and any subsequent read operations would reset memory circuit 410. Also, the reset operation could be triggered by a read operation to any register other than register 411. Various other reset options will be apparent.

Figure 5A:
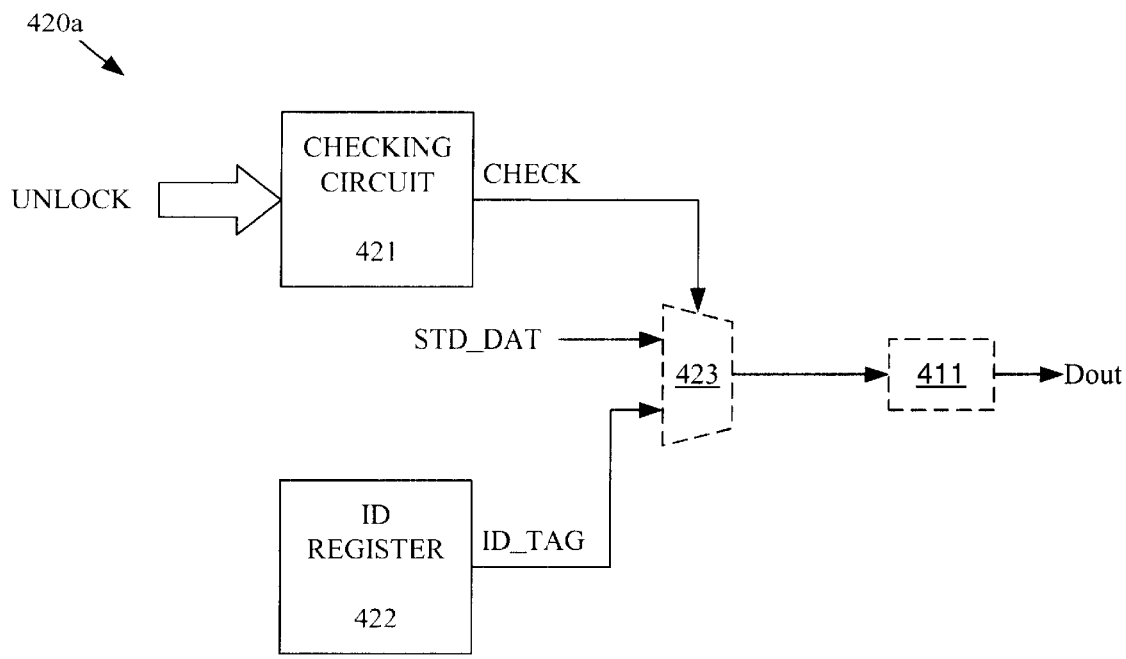
FIGS. 5a and 5b are schematic diagrams of detector circuits in accordance with various embodiments of the present invention.

FIG. 5a shows an example detector circuit 420a, in accordance with an embodiment of the present invention. Detector circuit 420a comprises a checking circuit 421 and an ID register 422. Checking circuit 421 is configured to generate signal CHECK in response to input operation UNLOCK, while ID register 422 provides identification tag ID_TAG. A multiplexer 423 (which along with register 411 can be part of memory circuit 410 shown in FIG. 4) is coupled to receive as inputs expected value STD_DAT and identification tag ID_TAG. The output of multiplexer 423 is selected by identification signal CHECK and is written to register 411. The data value stored in register 411 can then read out as output data value Dout. According to an embodiment of the present invention, expected value STD_DAT and identification tag ID_TAG could be provided to the LOW and HIGH input ports, respectively, of multiplexer 423, in which case identification signal CHECK would be asserted HIGH by checking circuit 421 in response to input operation UNLOCK. (Note that in an alternative embodiment of the present invention, expected value STD_DAT and identification tag ID_TAG could be provided to the HIGH and LOW input ports, respectively, of multiplexer 423, in which case identification signal CHECK would be asserted LOW by checking circuit 421 in response to input operation UNLOCK.) Register 411 would therefore store identification tag ID_TAG only after a correct input operation UNLOCK, at all other times storing expected value STD_DAT.

Thus, during normal operation, output data value Dout is equal to the expected data value REG_STD. However, when checking circuit asserts signal CHECK, multiplexer 423 provides identification tag ID_TAG to register 411. A subsequent read operation to register 411 would then read output data value Dout as being equal to identification tag ID_TAG. In this manner, identification tag ID_TAG is concealed during normal operation and is only accessible after a proper input operation UNLOCK, which causes detector circuit 420a to actually change the data value stored in register 411.

Figure 5B:
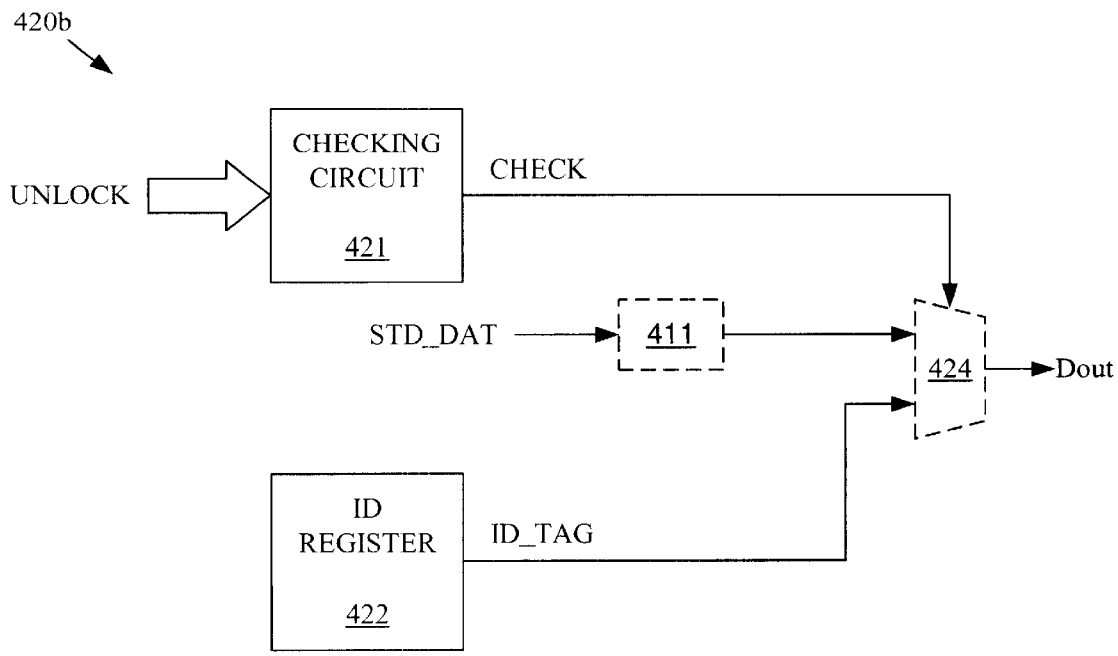

FIG. 5b shows another example detector circuit 420b, in accordance with another embodiment of the present invention. Like detector circuit 420a shown in FIG. 5a, detector circuit 420b includes a checking circuit 421 configured to generate signal CHECK in response to input operation UNLOCK, and an ID register 422 for providing identification tag ID_TAG. However, rather than a multiplexer providing input data to register 411, detector circuit 420b controls a multiplexer 424 located at the output of register 411. Multiplexer 424 can be part of memory circuit 410, and is coupled to receive as inputs expected value STD_VAL stored in register 411, and identification tag ID_TAG from ID register 422. The output data value Dout provided by multiplexer 424 is selected by signal CHECK. During normal operation, multiplexer 424 provides expected value STD_VAL from register 411 as output data value Dout, while during a checking operation, multiplexer 424 provides identification tag ID_TAG as output data value Dout. According to an embodiment of the present invention, expected value STD_DAT and identification tag ID_TAG could be provided to the LOW and HIGH input ports, respectively, of multiplexer 424, in which case identification signal CHECK would be asserted HIGH by checking circuit 421 in response to input operation UNLOCK. (Note that in an alternative embodiment of the present invention, expected value STD_DAT and identification tag ID_TAG could be provided to the HIGH and LOW input ports, respectively, of multiplexer 424, in which case identification signal CHECK would be asserted LOW by checking circuit 421 in response to input operation UNLOCK.) Multiplexer 424 would therefore provide identification tag ID_TAG as output data value Dout only after a correct input operation UNLOCK, at all other times providing expected value STD_DAT.

Once again identification tag ID_TAG is completely hidden during normal operation. However, in contrast to detector circuit 420a, detector circuit 420b does not change the data value stored in register 411. Instead, detector circuit 420b substitutes identification tag ID_TAG for the output of register 411, leaving the stored value in register 411 unchanged. Such a method would be useful where modifications to the stored data value could affect other portions of the core implementation.

Figure 5C:
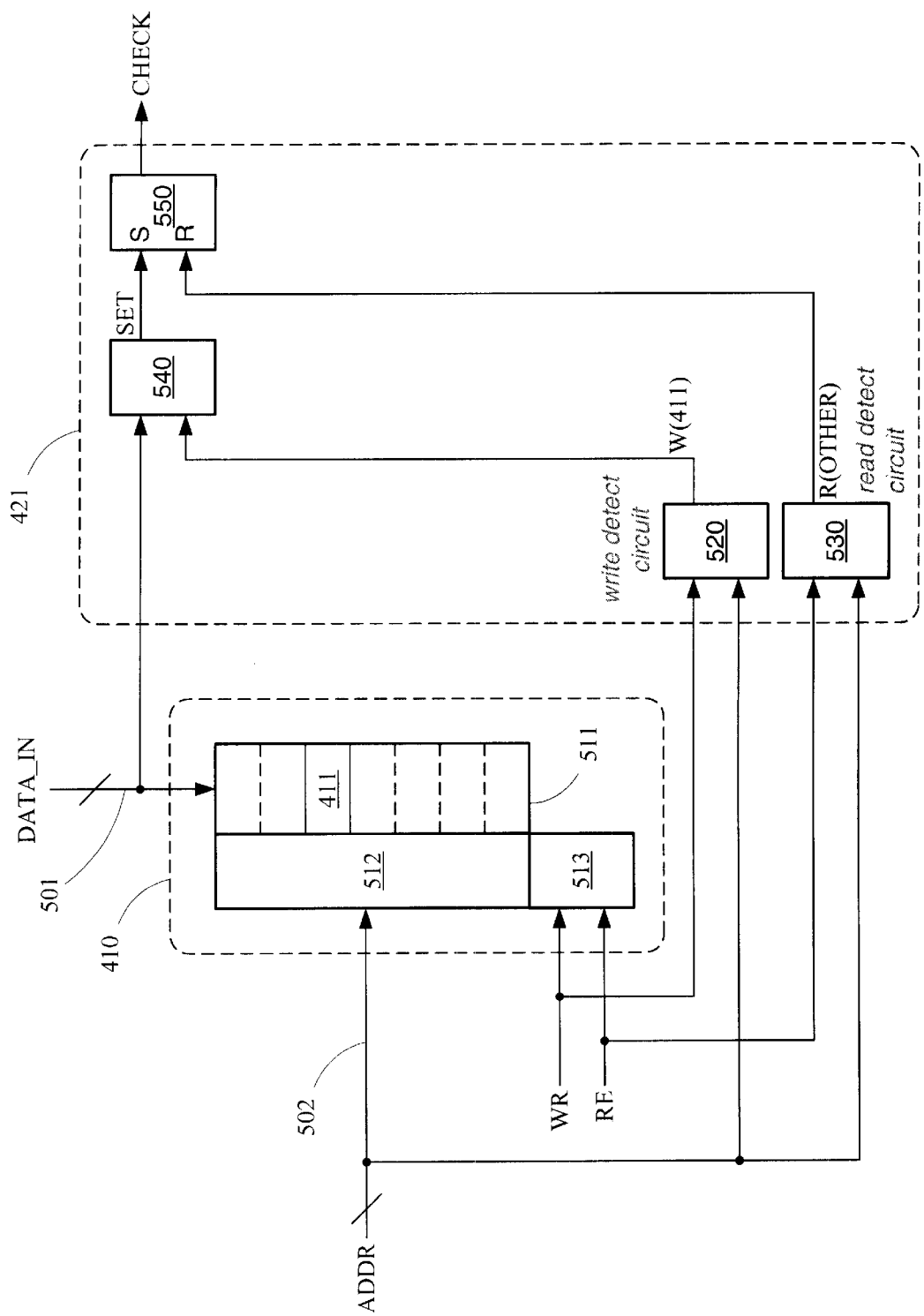
FIG. 5c is a schematic diagram of a checking circuit in accordance with an embodiment of the present invention.

As noted previously, input operation UNLOCK can comprise any action or set of actions. Accordingly, checking circuit 421 shown in FIGS. 5a and 5b must be configured to recognize whatever input operation UNLOCK is defined for a particular detector circuit implementation. For example, input operation UNLOCK might involve writing a particular value to a specific register. An example checking circuit that could be associated with such an input operation is shown in FIG. 5c, which depicts a checking circuit 421 in accordance with an embodiment of the present invention. FIG. 5c also includes a detail view of memory circuit 410, for explanatory purposes. Memory circuit 410 includes a memory array 511, which includes register 411. An address decoder 512 is coupled to receive an address ADDR placed on an address bus 502 and address the selected memory location. A control decoder 513 is coupled to receive a read enable signal RE during a read operation and a write enable signal WR during a write operation. Finally, a data bus 501 provides a data value DATA_IN to memory array 511 for write operations.

Figure 5D:
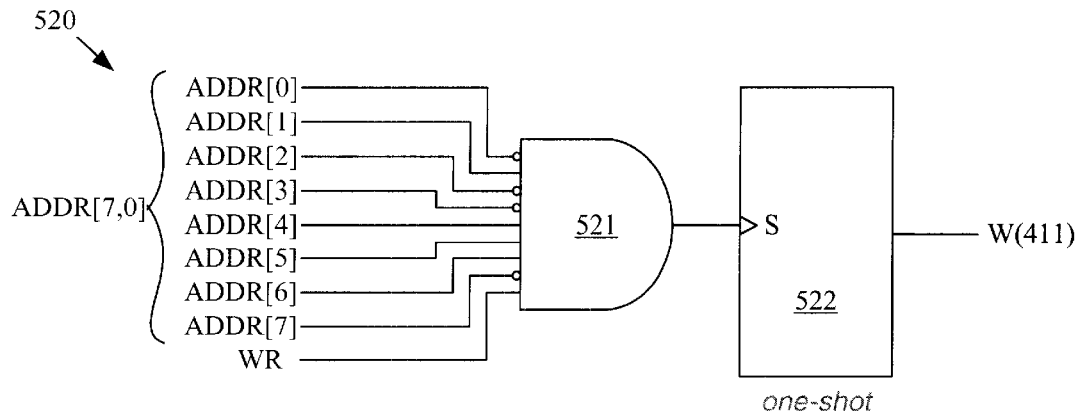
FIG. 5d is a schematic diagram of a write detect circuit in accordance with an embodiment of the present invention.

Checking circuit 421 includes a write detect circuit 520, a read detect circuit 530, a key detect circuit 540, and an SR flip-flop 550. Write detect circuit 520 is coupled to receive address ADDR from address bus 502 and write enable signal WR, producing a pulse W(411) when a write operation is performed on register 411. Pulse W(411) is a limited-duration logic HIGH signal. FIG. 5d shows a schematic of write detect circuit 520 in accordance with an embodiment of the present invention. Write detect circuit 520 includes an AND gate 521 and a one-shot 522. AND gate 521 is coupled to receive address ADDR[7,0] and write enable signal WR (which is asserted HIGH during a write operation). Note that while an 8-bit address is depicted, the present invention can accommodate any size address value. Note further that according to another embodiment of the present invention, if write enable signal WR is asserted LOW during a write operation, an inverter would be placed at the input of AND gate 521 receiving write enable signal WR. AND gate 521 is configured for register 411 having an address of 114. Therefore, bits 0, 2, 3, and 7 of address ADDR[7,0] are inverted at the inputs of AND gate 521 so that when write enable signal WR is asserted and address ADDR[7,0] is equal to 114 (binary 01110010), the output of AND gate 521 is asserted. In response to this logic HIGH transition at its edge-triggered input terminal, one-shot 522 generates pulse W(411), indicating that a write operation has been performed on register 411. The duration of pulse W(411) can be adjusted to ensure proper operation of checking circuit 421.

Returning to FIG. 5c, key detect circuit 540 is coupled to receive input data value DATA_IN from data bus 501, and pulse W(411) from write detect circuit 520, generating a signal SET in response. FIG. 5f shows a schematic of key detect circuit 540 in accordance with an embodiment of the present invention. Key detect circuit 540 includes an AND gate 541 coupled to receive input data value DATA IN[7,0] and pulse W(411). Note that while an 8-bit data value is depicted, the present invention can accommodate any size data value. AND gate 541 only asserts signal SET when a specific key value is written to register 411. In the example shown in FIG. 5f, the key value is 45 (binary 00101101). Accordingly, bits 1, 4, 6, and 7 of input word KEY[7,0] are inverted at the inputs of AND gate 541. Therefore, signal SET is only asserted when input data value DATA_IN[7,0] is equal to 45 (i.e., binary 00101101) and a write operation is performed on register 411 (i.e., pulse W(411) is HIGH). Note that because pulse W(411) has a limited duration, signal SET is also asserted for a limited time only.

Once again returning to FIG. 5c, signal SET from key detect circuit 540 is applied to the set terminal of flip-flop 550. When signal SET is asserted, flip-flop 550 asserts identification signal CHECK, indicating that the proper value has been written to register 411 (i.e., a correct input operation UNLOCK has been performed). For added security, the RESET terminal of flip-flop 550 is coupled to receive a signal R(OTHER) from read detect circuit 530. Signal R(OTHER) indicates a read operation to any register other than register 411. Therefore, even if a user happens to perform the correct input operation UNLOCK (in this case, writing a value of 45 to register 411), if register 411 is not read immediately, identification tag ID_TAG will be returned to its concealed state.

Figure 5E:
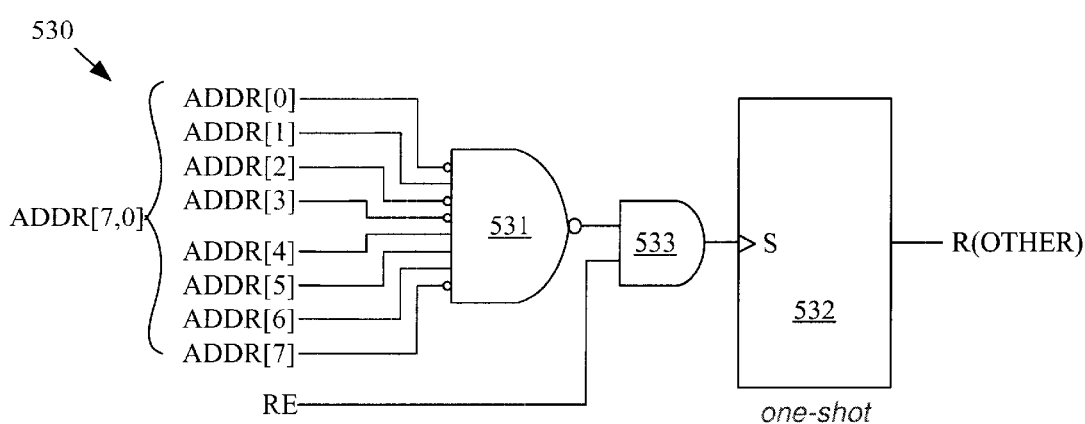
FIG. 5e is a schematic diagram of a read detect circuit in accordance with an embodiment of the present invention.
Figure 5F:
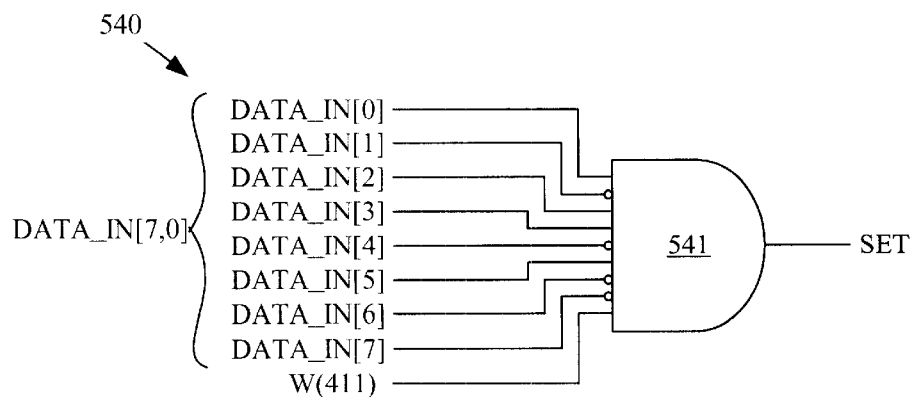
FIG. 5f is a schematic diagram of a key detect circuit in accordance with an embodiment of the present invention.

FIG. 5e shows a schematic of read detect circuit 530 in accordance with an embodiment of the present invention. Read detect circuit 530 includes a NAND gate 531, a one-shot 532, and an AND gate 533. NAND gate 531 is coupled to receive address ADDR[7,0] from address bus 502. Note that while an 8-bit address is depicted, the present invention can accommodate any size address value. NAND gate 521 is configured for register 411 having an address of 114. Therefore, bits 0, 2, 3, and 7 of address ADDR[7,0] are inverted at the inputs of NAND gate 521, so that as long as address ADDR[7,0] is not equal to 114 (binary 01110010), the output of NAND gate 521 is asserted. AND gate 533 is coupled to receive as inputs the output of NAND gate 531 and read enable signal RE (which is asserted HIGH during a read operation). Note that according to another embodiment of the present invention, if read enable signal RE is asserted LOW during a read operation, an inverter would be placed at the input of AND gate 533 receiving read enable signal RE. Therefore, the output of AND gate 533 is asserted any time a read operation is performed on a register other than register 411. In response to a logic HIGH transition at its edge-triggered input terminal, one-shot 532 generates pulse R(OTHER), indicating that a read operation has been performed on a register other than register 411. As noted previously, pulse R(OTHER) can then reset flip-flop 550 shown in FIG. 5c. The duration of pulse R(OTHER) can be adjusted to ensure proper operation of checking circuit 421.

In the various embodiments of this invention, methods and structures have been described to hide identification information in register-based programmable logic device cores. To read the identification information, a prespecified action must be performed, allowing unencumbered functionality of the actual device while minimizing the chances of a pirate being able to remove or change the identification information. Thus, unlicensed core use can be diminished and unauthorized use can be detected. By providing methods to minimize unlicensed use of cores, IP vendors are motivated to expend the time and effort to create large libraries of optimized cores to sell to end users. Thus, the cost and time for creating design files for register-based programmable logic by an end user can be reduced through the use of cores from IP vendors.

The various embodiments of the structures and methods of this invention that are described above are illustrative only of the principles of this invention and are not intended to limit the scope of the invention to the particular embodiments described. For example, in view of this disclosure, those skilled in the art can define other detector circuits and unlock actions, and use these alternative features to create a method, circuit, or system according to the principles of this invention. Thus, the invention is limited only by the following claims.

What is claimed is:

1. A method for concealing a source identifier for a core in an implementation of the core in a register-based programmable logic device, wherein the register-based programmable logic device includes a first register, the method comprising:

defining an unlock operation; and designing the core to configure the register-based programmable logic device wherein a read operation to the first register during normal operation of the implementation returns a first data value from a set of expected data values, and wherein a read operation to the first register after an unlock operation returns the source identifier.

2. The method of claim 1, wherein the set of expected data values does not include the source identifier.

3. The method of claim 1, wherein a plurality of action sequences are applied to the implementation during normal operation, and wherein the plurality of action sequences does not include the unlock operation.

4. The method of claim 1, wherein the unlock operation comprises writing a specified data value to the first register.

5. The method of claim 1, wherein the register-based programmable logic device includes a second register, and wherein the unlock operation comprises writing a specified data value to the second register.

6. The method of claim 1, further comprising resetting the output data value of the first register to one of the set of expected data values after a specified time period.

7. The method of claim 1, wherein the register-based programmable logic device further includes a plurality of registers, the method further comprising resetting the output data value of the first register to one of the set of expected data values after a read operation to any of the plurality of registers after the unlock operation.

8. The method of claim 1, wherein the register-based programmable logic device further includes a plurality of registers, the method further comprising resetting the output data value of the first register to one of the set of expected data values upon completion of a read operation to the first register or any of the plurality of registers after the unlock operation.

9. The method of claim 1, wherein the unlock operation causes the source identifier to be stored in the first register.

10. A core for a register-based programmable logic device, an implementation of the core in the register-based programmable logic device including a first register, the core comprising:

a first set of configuration data for configuring the implementation to return a first data value from a set of expected data values when a read operation is performed on the first register during normal operation of the implementation; and a second set of configuration data for configuring the implementation to return a source identifier when a read operation is performed on the first register after an unlock operation.

11. The core of claim 10, wherein the set of expected data values comprises a plurality of data values.

12. The core of claim 10, wherein the implementation functions in response to a plurality of action sequences during normal operation, and wherein the plurality of action sequences does not include the unlock operation.

13. The core of claim 10, wherein the unlock operation comprises writing a specified data value to the first register.

14. The core of claim 10, wherein the register-based programmable logic device includes a second register, and wherein the unlock operation comprises writing a specified data value to the second register.

15. The core of claim 10, further comprising a third set of configuration data for configuring the implementation to restore the original output of the first register after a specified time period.

16. The core of claim 10, further comprising a third set of configuration data for configuring the implementation to restore the original output of the first register upon completion of a single read operation after the unlock operation.

17. The core of claim 10, further comprising a PCI bus having a block of configuration memory including a reserved space, and wherein the reserved space includes the first register.

18. An implementation of a core in a register-based programmable logic device, the implementation including an identification circuit comprising:

a first register; and a detector circuit for replacing the output of the first register with a source identifier in response to an unlock operation, wherein the first register is configured to store at least one data value from a set of expected values during normal operation, and wherein the set of expected values does not include the hidden identifier.

19. The implementation of claim 18, wherein the detector circuit comprises:

a checking circuit for generating a control signal in response to the unlock operation; and a multiplexer coupled to receive as inputs one of the set of expected data values and the hidden identifier, the output of the multiplexer being controlled by the control signal.

20. The implementation of claim 19, wherein the output of the multiplexer is written to the first register.

21. The implementation of claim 19, wherein the one of the set of expected data values is provided to the multiplexer by the first register.

22. The implementation of claim 19, wherein the unlock operation comprises writing a specified data value to the first register, wherein the first register is coupled to a data bus, and wherein the checking circuit comprises:

a key detect circuit for asserting a detect signal in response to a write operation of the specified data value to the first register; and a flip-flop having a SET terminal and an output terminal, the SET terminal being coupled to receive the detect signal, wherein the flip-flop provides the control signal at the output terminal in response to the detect signal.

23. The implementation of claim 22, further comprising a write detect circuit for monitoring write operations performed by the implementation, wherein each write operation involves providing an address on an address bus and asserting a write enable signal to a logic HIGH level, the first register having a first address, the write detect circuit comprising:

a first AND gate, the first AND gate having a plurality of first AND gate input terminals and a first AND gate output terminal, a first one of the plurality of first AND gate input terminals being coupled to receive the write enable signal and the remainder of the plurality of first AND gate AND gate input terminals being coupled to the address bus, the first AND gate being configured to assert a write signal in response to the first address on the address bus and the write enable signal; and a first one-shot having a first one-shot input terminal and a first one-shot output terminal, the first one-shot input terminal being coupled to the first AND gate output terminal, the first one-shot output terminal providing a write detect pulse in response to the write signal.

24. The implementation of claim 23, wherein each write operation further comprises providing an input data value on a data bus, the key detect circuit comprising a second AND gate, the second AND gate having a plurality of second AND gate input terminals and a second AND gate output terminal, a first one of the plurality of second AND gate input terminals being coupled to receive the write detect pulse and the remainder of the plurality of second AND gate input terminals being coupled to the data bus, the second AND gate being configured to assert the detect signal in response to the specified data value on the data bus and the write detect pulse.

25. The implementation of claim 24, wherein the flip-flop further comprises a reset terminal, the implementation further including a read detect circuit for monitoring read operations performed by the implementation, wherein each read operation involves asserting a read enable signal, the read detect circuit comprising:

a NAND gate comprising a plurality of NAND gate input terminals and a NAND gate output terminal, the plurality of NAND gate input terminals being coupled to the address bus, the NAND gate being configured to assert an address signal when the first address is not on the address bus;

a second AND gate coupled to receive the address signal and the read enable signal and generate a read signal; and a second one-shot coupled to receive the read signal, the second one-shot providing a read detect pulse to the reset terminal in response to the read signal.

* * * * *